(12) United States Patent
Johnston et al.

(10) Patent No.: US 7,110,152 B2
(45) Date of Patent: Sep. 19, 2006

(54) VIRTUAL SCANNING FROM A SCANNED IMAGE PREVIEW

(75) Inventors: Kairi Ann Johnston, Star, ID (US); Virgil K. Russon, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 917 days.

(21) Appl. No.: 09/944,691

(22) Filed: Aug. 31, 2001

(65) Prior Publication Data

US 2003/0043399 A1    Mar. 6, 2003

(51) Int. Cl.
*H04N 1/46* (2006.01)
*H04N 1/387* (2006.01)

(52) U.S. Cl. ..................... 358/538; 358/453
(58) Field of Classification Search ............. 358/1.15, 358/1.18, 507, 538, 474, 475, 471, 485, 453; 382/189
See application file for complete search history.

(56) References Cited

U.S. PATENT DOCUMENTS

| | | | |
|---|---|---|---|
| 6,289,371 B1 * | 9/2001 | Kumpf et al. | 709/203 |
| 6,466,302 B1 * | 10/2002 | Rousseau et al. | 355/61 |
| 6,751,780 B1 * | 6/2004 | Neff et al. | 715/530 |
| 2001/0045964 A1 * | 11/2001 | Camara et al. | 345/810 |
| 2002/0048411 A1 * | 4/2002 | Takayama et al. | 382/275 |
| 2002/0118891 A1 * | 8/2002 | Rudd et al. | 382/282 |
| 2002/0196479 A1 * | 12/2002 | Simske | 358/474 |
| 2003/0095269 A1 * | 5/2003 | Kubo et al. | 358/1.9 |
| 2003/0202715 A1 * | 10/2003 | Kinjo | 382/282 |

FOREIGN PATENT DOCUMENTS

| | | | |
|---|---|---|---|
| EP | 0991263 A2 * | 4/2000 | |
| EP | 0991265 A2 * | 4/2000 | |

* cited by examiner

Primary Examiner—Jerome Grant

(57) ABSTRACT

An imaging system scanning device preview-scans an image and generates image data that is used to generate a scanned image preview. The scanned image preview is displayed in a viewing region of a user interface and represents the image in an electronic form. An image region of the scanned image preview can be defined and selected, and a final-scan of the image region emulated with a software or firmware component that generates a final scanned image. An emulated final-scan of the image region includes interpolating the image data corresponding to the image region to improve the resolution of the image region when generating the final scanned image. The final scanned image can be communicated to a destination location such as a data storage component, or to an image reproduction device.

53 Claims, 6 Drawing Sheets

VIRTUAL SCANNING FROM A SCANNED IMAGE PREVIEW

TECHNICAL FIELD

This invention relates to image scanning and, in particular, to virtually scanning image data to generate a final scan from a scanned image preview.

BACKGROUND

Scanning technology captures an image, or regions of an image, from a printed document, photograph, or other similar image media, and converts the image into an electronic form. Initially, an image is scanned to generate a preview of the image, which is also commonly referred to as a preview scan. To save file space in memory, only those sections of the image that are intended to be used can be selected from the preview scan before performing a final scan of the image and generating image data that will be saved in memory.

An image media, such as a document, can have any number of image regions that are commonly designated as text, tables, photographs in either black and white or color, and line art or graphics in either black and white or color. Typically, a scanning software application receives scanned image data and classifies the different image types into image regions for a particular document.

A preview scan is typically a low resolution scan of an image which takes less time to process, but is displayable for user processing. For example, regions of an image shown in a preview scan can be selected, or otherwise cropped, from which a final scan of the selected image regions is generated. For the second, and final scan, a flatbed scanner re-scans only the selected image regions at a higher resolution to produce a higher quality printable and viewable scanned image.

Advances in media reproduction and imaging technology have created a trend towards smaller and affordable multifunction devices in place of traditional stand-alone, single purpose devices such as photocopiers, fax machines, and flatbed scanners. Multifunction devices, as the name implies, are devices capable of multiple functions such as printing, copying, scanning, and/or faxing.

For a multifunction device with scanning capability, and having an automatic document feeder (ADF), the scan head or image recognition component of the device is fixed. The image media having an image to be scanned is passed over the stationary scanning component to initially scan the image and generate a preview scan of the image. Consequently, the image media is not then in a position to be re-scanned to generate a final scan of the selected image regions. Instead of being able to scan twice, once for a preview scan, and again to scan the selected image regions as with a flatbed scanner, an automatic document feed scanner does not have an option to allow a second scan at a higher resolution to generate a higher quality printable and viewable scanned image.

SUMMARY

An imaging system scanning device, such as an automatic document feed scanning device or multifunction device having scanning capability, preview-scans an image and generates image data corresponding to the image. A software or firmware component generates a scanned image preview from the image data. The scanned image preview is displayed in a viewing region of a user interface and represents the image in an electronic form.

An image region selection control on the user interface is manipulated to select an image region of the scanned image preview. The software or firmware component emulates a final-scan of the of the image region to generate a final scanned image. An emulated final-scan of the image region includes interpolating the image data corresponding to the image region to improve the resolution of the image region when generating the final scanned image. The final scanned image can be communicated to a destination location such as a data storage component, or to an image reproduction device.

BRIEF DESCRIPTION OF THE DRAWINGS

The same numbers are used throughout the drawings to reference like features and components.

DETAILED DESCRIPTION

Introduction

The following describes systems and methods for virtually scanning an image from a scanned image preview to generate a final scanned image. A scanning device preview-scans an image and generates a scanned image preview which is displayed on a display device within a graphical user interface. The user interface has selection controls to select, or otherwise define, a region or regions of the image to final-scan and generate a final scanned image which can be saved to memory, sent to a printer, faxed to a recipient, or otherwise processed for e-media communication.

Exemplary Multifunction Device Architecture

Figure 1:
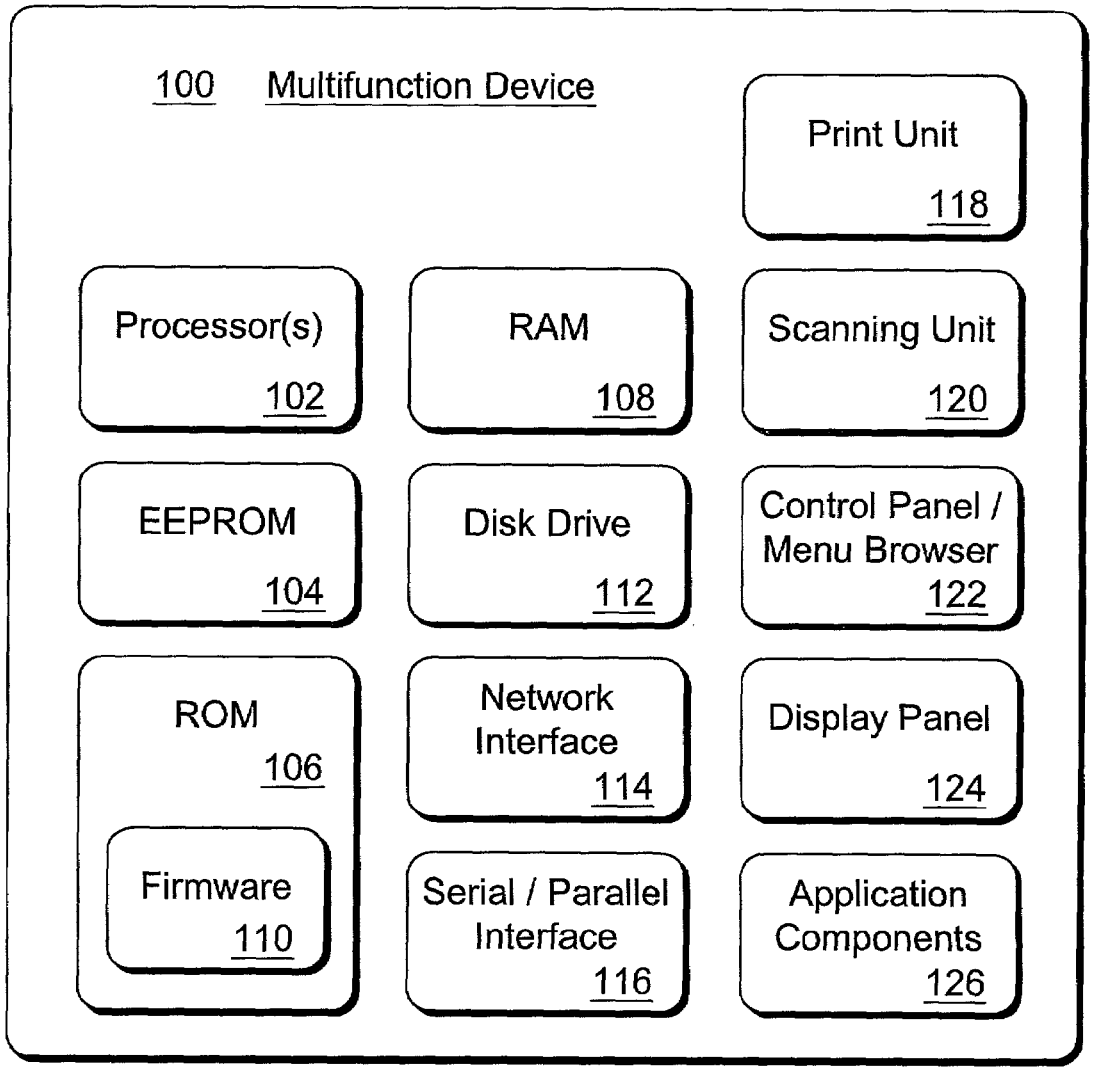
FIG. 1 is block diagram that illustrates various components of an exemplary multifunction device.

FIG. 1 illustrates various components of an exemplary multifunction device 100. A multifunction device, as the name implies, is a device capable of multiple functions which are related, but not limited to, printing, copying, scanning, to include image acquisition and text recognition, sending and receiving faxes, print media handling, and/or data communication, either by print media or e-media, such as via email or electronic fax.

Multifunction device 100 includes one or more processors 102, an electrically erasable programmable read-only memory (EEPROM) 104, ROM 106 (non-erasable), and a random access memory (RAM) 108. Although multifunction device 100 is illustrated having an EEPROM 104 and ROM 106, a particular device may only include one of the memory components. Additionally, although not shown, a system bus typically connects the various components within multifunction device 100.

Multifunction device 100 also includes a firmware component 110 that is implemented as a permanent memory module stored on ROM 106. Firmware 110 is programmed and tested like software, and is distributed with the multifunction device 100. Firmware 110 can be implemented to coordinate operations of the hardware within multifunction device 100 and contains programming constructs used to perform such operations.

Processor(s) 102 process various instructions to control the operation of multifunction device 100 and to communicate with other electronic and computing devices. The memory components, EEPROM 104, ROM 106, and RAM 108, store various information and/or data such as configuration information, fonts, templates, print data, scanned image data, and menu structure information. Although not shown, a particular multifunction device can also include a flash memory device in place of or in addition to EEPROM 104 and ROM 106.

Multifunction device 100 also includes a disk drive 112, a network interface 114, and a serial and/or parallel interface 116. Disk drive 112 provides additional storage for data being printed, copied, scanned, and/or faxed, or other information maintained by multifunction device 100. Although multifunction device 100 is illustrated having both RAM 108 and a disk drive 112, a particular multifunction device may include either RAM 108 or disk drive 112, depending on the storage needs of the multifunction device.

Network interface 114 provides a connection between multifunction device 100 and a data communication network. Network interface 114 allows devices coupled to a common data communication network to send print jobs, faxes, menu data, and other information to multifunction device 100 via the network. Similarly, the serial and/or parallel interface 116 provides a data communication path directly between multifunction device 100 and another electronic or computing device. Although multifunction device 100 is illustrated having a network interface 114 and serial and/or parallel interface 116, a particular multifunction device may only include one such interface component.

Multifunction device 100 also has a print unit 118 that includes mechanisms arranged to selectively apply ink (e.g., liquid ink, toner, etc.) to a print media such as paper, plastic, fabric, and the like in accordance with print data corresponding to a print job. For example, print unit 118 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner.

Print unit 118 can also be configured to support duplex printing, for example, by selectively flipping or turning the print media as required to print on both sides. Those skilled in the art will recognize that there are many different types of print units available, and that for the purposes of the present invention, print unit 118 can include any of these different types.

Multifunction device 100 also has a scanning unit 120 that can be implemented as an optical scanner to produce machine-readable image data signals that are representative of a scanned image, such as a photograph or a page of printed text. The image data signals produced by scanning unit 120 can be used to reproduce the scanned image on a display device, such as a computer display or a printer.

Multifunction device 100 also includes a control panel and menu browser 122, and a display panel 124. The control panel and menu browser 122 allows a user of the multifunction device 100 to navigate the device's menu structure. Control panel 122 can be indicators or a series of buttons, switches, or other selectable controls that are manipulated by a user of the multifunction device. Display panel 124 is a graphical display that provides information regarding the status of the multifunction device 100 and the current options available to a user through the menu structure.

Multifunction device 100 can, and typically does include application components 126 that provide a runtime environment in which software applications or components can run or execute. Those skilled in the art will recognize that there are many different types of available runtime environments. A runtime environment facilitates the extensibility of multifunction device 100 by allowing various interfaces to be defined that, in turn, allow the application components 126 to interact with the multifunction device.

General reference is made herein to multifunction and/or data and media reproduction devices, such as multifunction device 100. Although specific examples may refer to one or more multifunction devices having particular functionalities, such examples are not meant to limit the scope of the claims or the description, but are meant to provide a specific understanding of the described implementations. Furthermore, It is to be appreciated that the described components are exemplary, and are not intended to limit application of the claimed subject matter to multifunction and reproduction devices that include only these components. Accordingly, other devices having components different from and/or in addition to those described herein can be used in implementing the described techniques and systems.

Exemplary Computer Architecture

Figure 2:
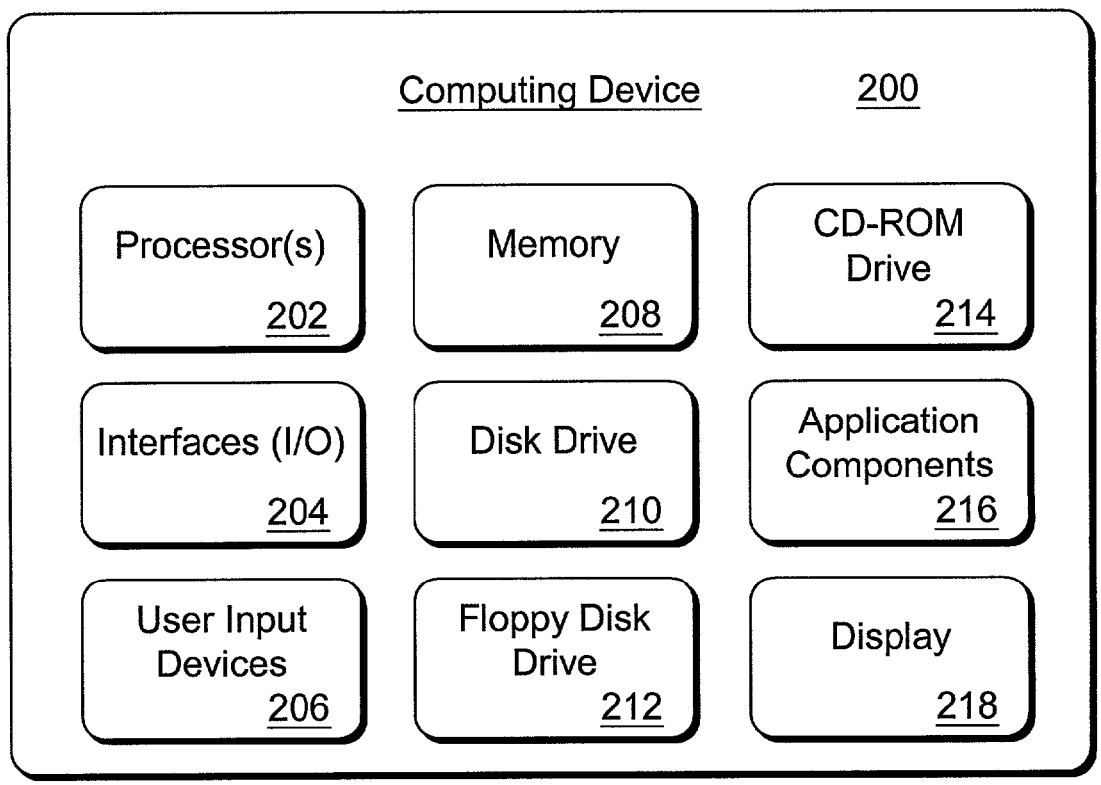
FIG. 2 is block diagram that illustrates various components of an exemplary computing device.

FIG. 2 illustrates various components of an exemplary computing device 200 that can be utilized to implement the inventive techniques described herein. Computer 200 includes one or more processors 202, interfaces 204 for inputting and outputting data, and user input devices 206. Processor(s) 202 process various instructions to control the operation of computer 200, while interfaces 204 provide a mechanism for computer 200 to communicate with other electronic and computing devices, such as multifunction device 100 (FIG. 1). User input devices 206 include a keyboard, mouse, pointing device, and/or other mechanisms for interacting with, and inputting information to computer 200.

Computer 200 also includes a memory 208 (such as ROM and/or RAM), a disk drive 210, a floppy disk drive 212, and a CD-ROM drive 214. Memory 208, disk drive 210, floppy disk drive 212, and CD-ROM drive 214 provide data storage mechanisms for computer 200. Although not shown, a system bus typically connects the various components within the computing device 200.

Computer 200 also includes application components 216 and can include an integrated display device 218, such as for a portable laptop computer, personal digital assistant (PDA), and similar computing devices. Application components 216 provide a runtime environment in which software applications or components can run or execute on processor(s) 202.

Exemplary Image Scanning System

Figure 3:
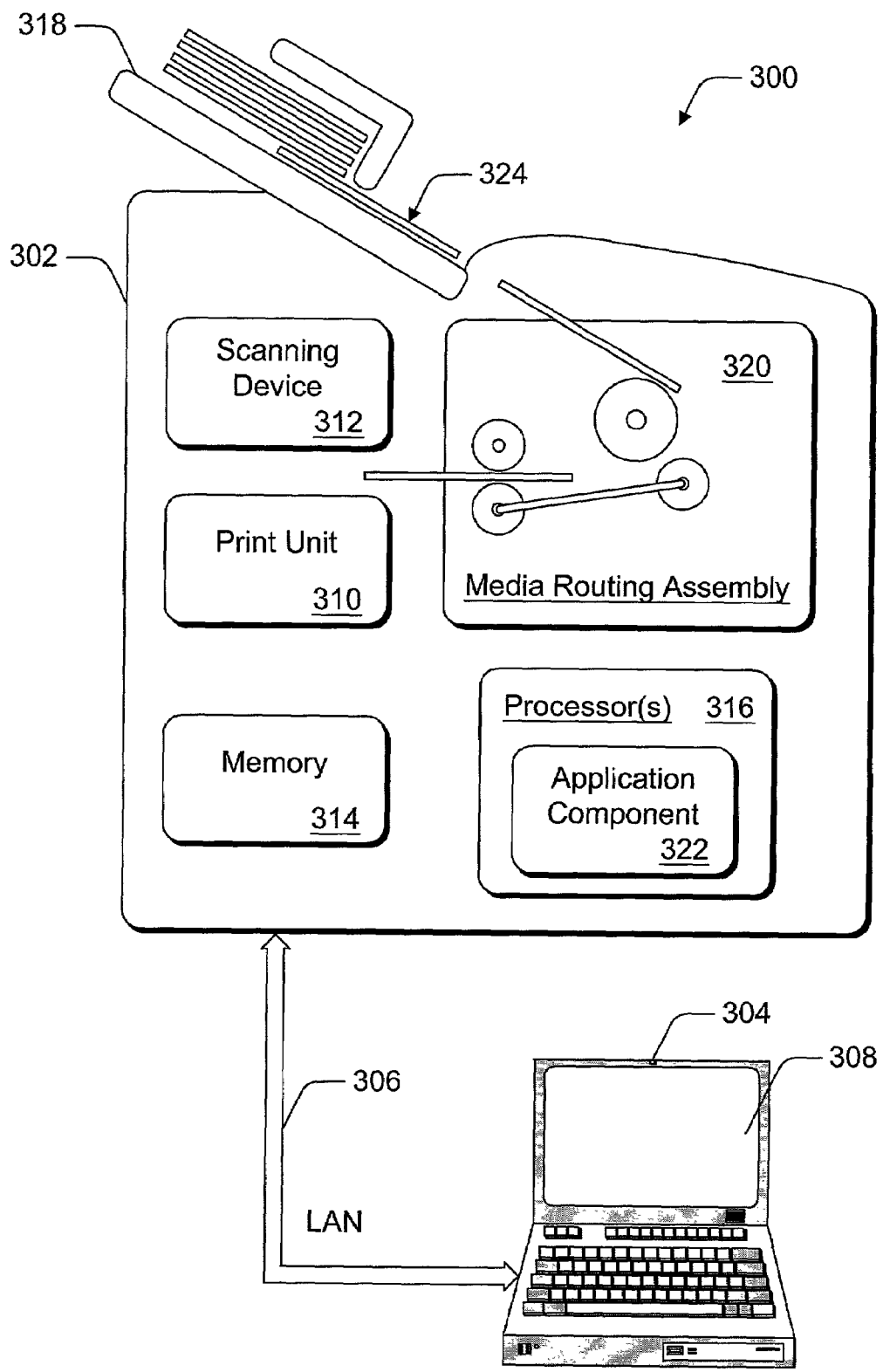
FIG. 3 is a block diagram that illustrates components of an exemplary image scanning system.

FIG. 3 illustrates components of an exemplary image scanning system 300 in which a multifunction device 302 has a communication link with computing device 304 (FIG. 2) via a data communication network 306. Multifunction device 302 can include one or more of the components of exemplary multifunction device 100 (FIG. 1), and computing device 304 can include one or more of the components of exemplary computing device 200 (FIG. 2), to include a display 308.

The data communication network 306 can be any type of network, such as a local area network (LAN) or a wide area network (WAN), using any type of network topology and any network communication protocol. Although only the two devices are shown communicatively linked via network 306, a typical network can have any number of devices connected to it, either directly or indirectly via another network system. The Internet is an example of multiple connected network systems each having multiple devices. Multifunction device 302 and computing device 304 can also have modems and/or network cards that facilitate network communication and data transfer via data communication network 306.

Multifunction device 302 includes a print unit 310, a scanning unit 312, a memory 314, and one or more processors 316. Each of these components are described above with respect to the exemplary multifunction device 100 (FIG. 1). Multifunction device 302 also includes an automatic document feeder (ADF) 318, a media routing assembly 320, and an application component 322. Automatic document feeder 318 accepts multiple image media 324 and automatically feeds the image media into multifunction device 302 for scanning. Image media includes any print media, photographs, graphics, and the like that can be scanned with scanning unit 312.

The media routing assembly 320 takes up an image or print media 324 and routes it through multifunction device 302 for scanning. This physical path of the image or print media through the multifunction device is typically referred to as the "print path" or "print medium path". When image media 324 is routed within multifunction device 302 by the media routing assembly, the image media 324 passes within a proximity of scanning unit 312 which scans an image on the image media. Application component 322 executes on processor(s) 316 and receives image data corresponding to a scanned image from scanning unit 312. Alternatively, or in addition to application component 322 receiving image data corresponding to a scanned image, an application component in computing device 304 receives the image data from scanning unit 312 via the data communication link 306.

It should be appreciated that multifunction device 302 in this example is an ADF multifunction device. That is, an image recognition component of scanning unit 312 is fixed within multifunction device 302 and the image media 322 passes the recognition component when scanning an image. This is functionally different from a flatbed scanner that positions an image media on a glass surface, for example, and then drives the image recognition component to scan an image on the image media. It should also be recognized that a flatbed scanner can also incorporate an automatic document feeder for the purpose of automatically feeding image media into place for scanning. However, a flatbed scanner having an automatic document feeder still drives an image recognition component to scan an image.

Exemplary Image Scanning System User Interfaces

Figure 4:
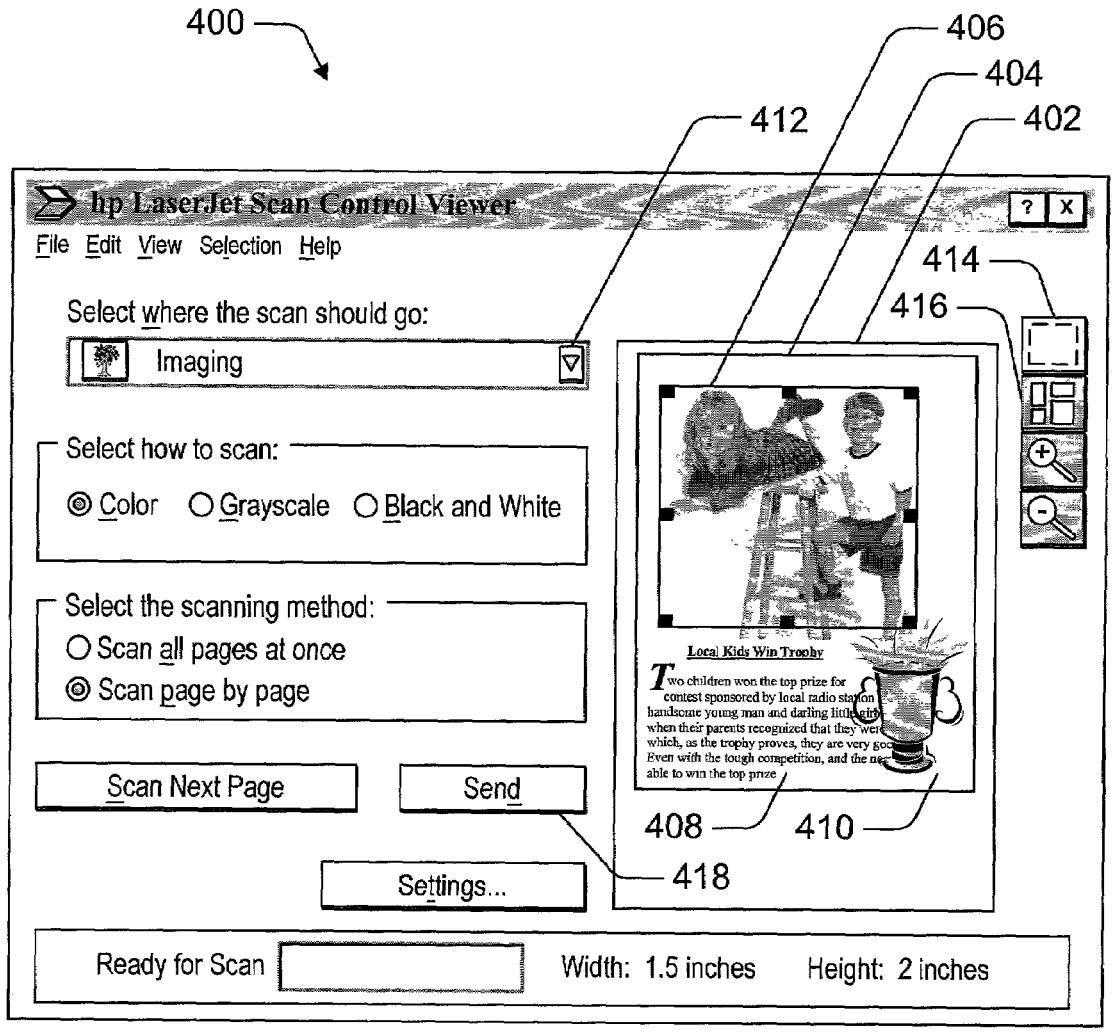
FIG. 4 is an illustration of an image scanning system user interface.

FIG. 4 illustrates an image scanning system user interface 400 which can be displayed on a computing device display, such as display 308 integrated with computing device 304 (FIG. 3). User interface 400 has a viewing region 402 to display a scanned image preview 404.

An imaging device, such as multifunction device 300, performs an initial scan of an image to generate image data corresponding to the image. A scanning application component, such as application component 322 in multifunction device 302, or application component 216 in computing device 200, creates the scanned image preview 404 from the image data. FIG. 4 illustrates an example scanned image preview 404 of an image having a photo region 406, a text region 408, and a lineart region 410.

User interface 400 includes multiple selection controls to initiate scanning an image, processing and/or editing the image, and saving a final electronic form of the scanned image. The user interface selection controls include an image destination selection control 412, an image region selection control 414, an image region definition control 416, and a final-scan selection control 418.

The image destination selection control 412 is selected before initiating a scan of an image to choose a destination for a final scan of the image. A scanned image destination can include a printing device, to include the multifunction device utilized to scan the image, a faxing device, a data storage component, such as a memory component in a computing device or in the multifunction device, a third-party application such as an email program, and the like.

A final scanned image is processed to correspond to an image destination selection. For example, an image such as a photograph is final scanned as bit map data, a text image is processed with an optical character recognition software component to form text data, and a graphic image is final scanned as raster graphic data.

The image region selection control 414 is selectable to choose a region of the scanned image preview 404 to retain for a final-scan of the image data to generate a final scanned image. This is commonly referred to as "cropping" a preview scan. For example, FIG. 4 illustrates that photo region 406 is selected as the image region of the scanned image preview 404 to retain for a final scan.

The final-scan selection control 418 (e.g., the "Send" selectable control on user interface 400) initiates a final-scan of the image data corresponding to the image region selected to be retained, and generates a final scanned image that is routed according to an image destination selection choice. A final-scan of the image data is a virtual scan of the image performed by the scanning application component.

With an ADF multifunction device, or ADF imaging device, the image media is routed past the recognition component of a scanning unit when scanning an image. As a result, the image media is no longer positioned for the second, final-scan after the initial pre-view scan, as it typically would be in a flatbed scanner. It should be appreciated that the inventive techniques and systems described herein are not only applicable to an ADF imaging device, but also to a flatbed scanner. A scanning application component for a flatbed scanner can also emulate a final-scan of image data, rather than driving an image recognition component to again scan the image to generate a final scanned image.

The scanning application component interpolates the image data to improve and/or optimize the resolution of the image region selected to be retained when virtually generating a final-scan of the image. The sharpness of a printed image depends on the resolution which refers to the number of dots within a measurable area, and is expressed in terms of the number of dots on a horizontal axis and on a vertical axis, typically within one inch. The sharpness of a scanned image also depends on the resolution which refers to the number of pixels per inch (PPI).

The scanning application component evaluates the image data and estimates for new pixel data to be added between existing pixels by taking an average of the known pixel values at neighboring points to where the new pixel data is to be added (i.e., interpolates). The existing pixel data is generated during the initial preview scan from the original image. However to create new pixel data for a final scanned image, non existing data has to be created and added between existing pixels.

A new pixel value can be derived from an average of the surrounding pixel values, or more complex algorithms can be implemented to expand and include many more surrounding pixel values to calculate a new value for just one new pixel. More complex resolution interpolation algorithms go a step further and try to detect detail patterns that occur near to where a new pixel is to be added so as to further and more accurately adjust a new averaged value for new pixel data.

A common resolution PPI value for an initial preview-scan is seventy-five (75) ppi which takes less time to generate the image data than it would for a higher resolution scan. For a final image scan, such as for photos and graphics, a higher resolution of one-hundred fifty (150) ppi is considered optimal, and for text that will be processed for optical character recognition (OCR), three-hundred (300) ppi is considered to be optimal. These PPI values are described as "optimal" with respect to the resolution detection capability of the human eye. For the most part, a human eye cannot detect a difference between one-hundred fifty (150) ppi and three-hundred (300) ppi. For an enlarged photo, or for other applications, "optimal" may require a higher resolution PPI.

For the image scanning system described herein, the preview-scan resolution value has a default setting of one-hundred fifty (150) ppi to accommodate photos and graphics which reduces processing time and increases resolution quality when interpolating to generate a final scanned image having a resolution of three-hundred (300) ppi. It would take more processing time to interpolate from a resolution of seventy-five (75) ppi to three-hundred (300) ppi, and depending upon the complexity of the interpolation algorithm, the resolution quality will be better when starting with a preview scan having a resolution of one-hundred fifty (150) ppi rather than seventy-five (75) ppi.

Figure 5:
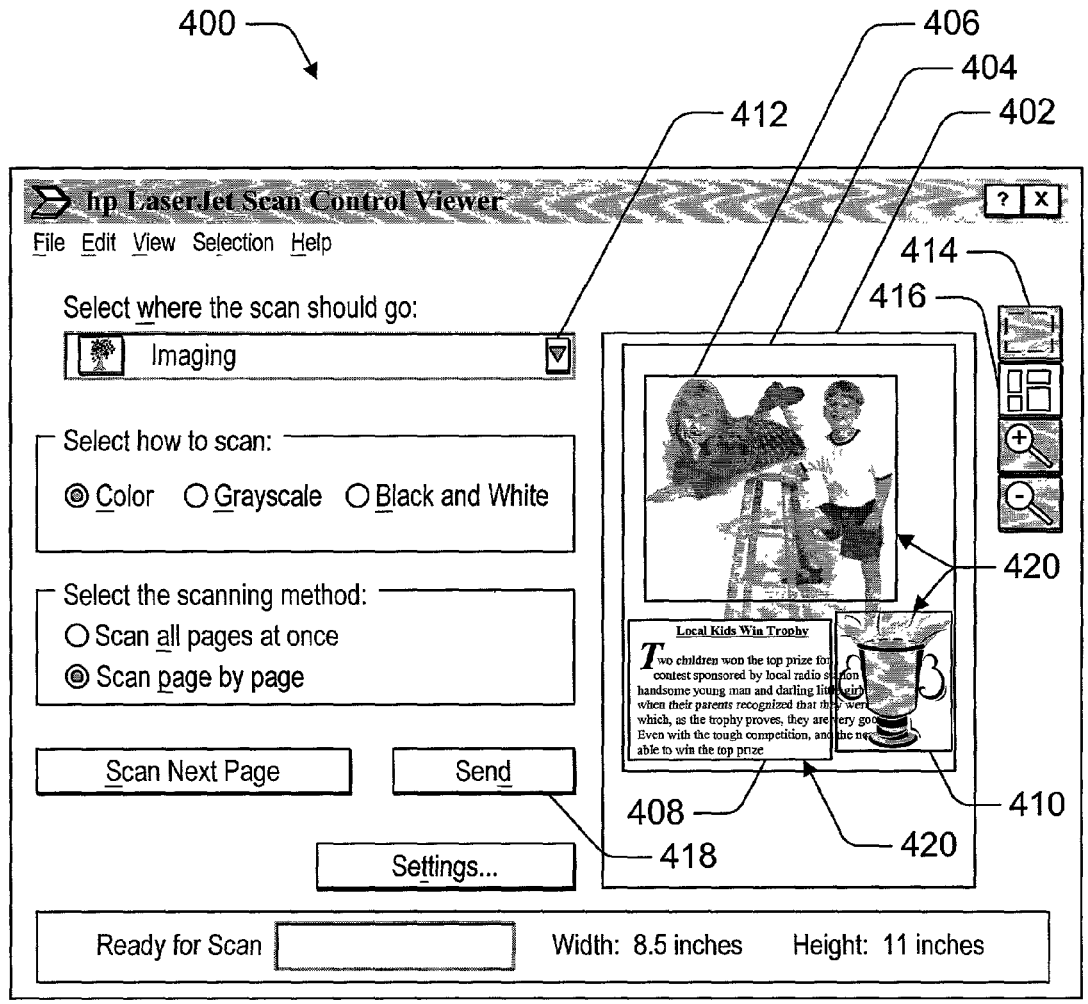
FIG. 5 is an illustration of the image scanning system user interface shown in FIG. 4.

FIG. 5 further illustrates the image scanning system user interface 400 shown in FIG. 4. FIG. 5 shows the image region definition control 416 hi-lited to indicate that it has been selected. When the region definition control 416 is selected, the regions of the scanned image preview 404 are each identified in the viewing region 402. Each of the photo region 406, text region 408, and lineart region 410 have a border 420 to indicate the boundaries of each region, as defined by the software application component. By further selecting an individual region, the classification or definition of the particular region can be changed. For example, text region 408 may be initially defined by the software application component as drawing information when detecting the large capitalized first letter of the paragraph. Text region 408 can be redefined as text by selecting the image region definition control 416.

Methods for Virtual Scanning from a Preview Scanned Image

Figure 6:
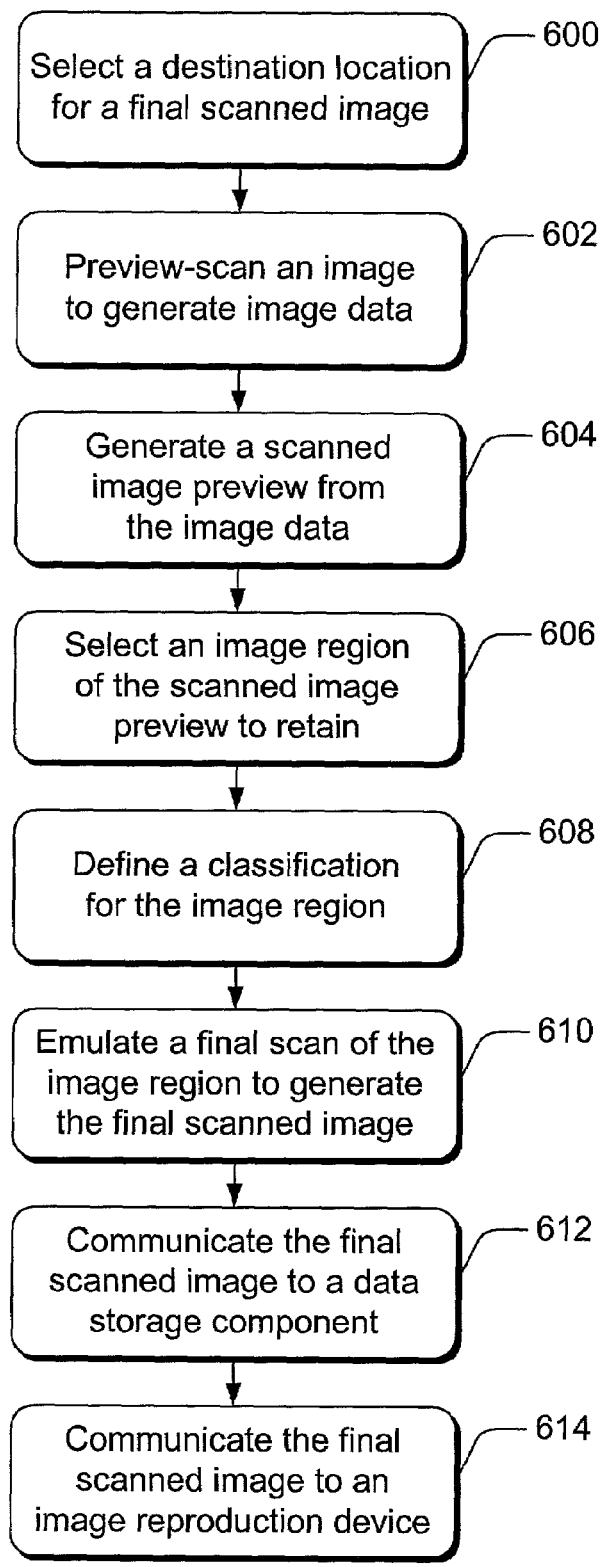
FIG. 6 is a flow diagram that describes methods for virtual scanning an image from a scanned image preview.

FIG. 6 illustrates method(s) for emulating a final-scan of an image region displayed in a scanned image preview. The order in which the method is described is not intended to be construed as a limitation. Furthermore, the method can be implemented in any suitable hardware, software, firmware, or combination thereof.

At block 600, a destination location for a final scanned image is selected. A destination location can include a data storage component to maintain the final scanned image, or an image reproduction device to reproduce the image, such as a printer or fax device.

At block 602, an image is preview-scanned to generate image data. The image can be scanned with an imaging device such as an automatic document feed scanning device, or multifunction device having scanning capability. At block 604, a scanned image preview is generated from the image data corresponding to the image.

At block 606, an image region of the scanned image preview is selected to be retained. The image region can be selected, or the scanned image preview cropped, with an image region selection control on a user interface. At block 608, a classification for the image region is defined. The image region can be classified as a photograph, as text, or as a graphic, for example.

At block 610, a final-scan of the image region is emulated to generate a final scanned image. Emulating the final-scan includes final-scanning the image region without a re-scan of the image, and interpolating the image data to improve a resolution of the image region.

At block 612, the final scanned image is communicated to a data storage component where the final scanned image is maintained. Alternatively, or in addition, the final scanned image is communicated to an image reproduction device, and the final scanned image is reproduced at block 614.

Conclusion

An image scanning system having an automatic document feed scanning device emulates a final-scan of an image region to generate a final scanned image by interpolating image data corresponding to the image region. The virtual final-scan generates the final scanned image with a higher resolution than when the image is preview-scanned to generate a higher quality printable and viewable scanned image.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An imaging system, comprising:
a component configured to generate a scanned image preview from image data corresponding to an image, the scanned image preview representing the image in an electronic form;
an image region selection control configured for manipulation to select an image region of the scanned image preview to retain; and
the component further configured to emulate a final-scan of the image region to generate a final scanned image, wherein the component emulates the final-scan of the image region without a re-scan of the image.

2. An imaging system as recited in claim 1, further comprising an imaging device configured to preview-scan the image and generate the image data.

3. An imaging system as recited in claim 1, wherein the component is a scanning software component.

4. An imaging system as recited in claim 1, wherein the component is further configured to emulate the final-scan of the image region by processing the image data corresponding to the image region.

5. An imaging system as recited in claim 1, wherein the component is further configured to interpolate the image data to improve a resolution of the image region.

6. An imaging system as recited in claim 1, wherein the component is further configured to emulate the final-scan of the image region by interpolating the image data corresponding to the image region to improve a resolution of the image region.

7. An imaging system as recited in claim 1, further comprising an image destination selection control configured for manipulation to select a destination location for the final scanned image, wherein the component is configured to differently process the image data based upon the destination location to form the emulated final scan image data.

8. An imaging system as recited in claim 1, further comprising an image destination selection control configured for manipulation to select a data storage component as a destination location for the final scanned image.

9. An imaging system as recited in claim 1, further comprising an image destination selection control configured for manipulation to select an image reproduction device as a destination location for the final scanned image.

10. An imaging system as recited in claim 1, further comprising an image region definition control configured for manipulation to define a classification of the image region.

11. An imaging system as recited in claim 1, further comprising an image region definition control configured for manipulation to define the image region as a photograph, and wherein the final scanned image is bit map data.

12. An imaging system as recited in claim 1, further comprising an image region definition control configured for manipulation to define the image region as text, and wherein the final scanned image is processed with an optical character recognition component to form text data.

13. An imaging system as recited in claim 1, further comprising an image region definition control configured for manipulation to define the image region as a graphic, and wherein the final scanned image is raster graphic data.

14. An imaging system as recited in claim 1, further comprising a user interface that includes the image region selection control and a viewing region to display the scanned image preview.

15. An imaging system as recited in claim 1, further comprising:
an image destination selection control configured for manipulation to select a destination location for the final scanned image; and
a user interface that includes the image region selection control, the image destination selection control, and a viewing region to display the scanned image preview.

16. An imaging system as recited in claim 1, further comprising:
an image region definition control configured for manipulation to define a classification of the image region; and
a user interface that includes the image region selection control, the image region destination control, and a viewing region to display the scanned image preview.

17. An imaging system as recited in claim 1, further comprising:
an image destination selection control configured for manipulation to select a destination location for the final scanned image;
an image region definition control configured for manipulation to define a classification of the image region; and
a user interface that includes the image region selection control, the image destination selection control, the image region definition control, and a viewing region to display the scanned image preview.

18. An automatic document feed scanning device, comprising:
a scanning unit configured to preview-scan an image and generate image data;
a component configured to generate a scanned image preview from the image data, the scanned image preview representing the image in an electronic form;
an image region selection control configured for manipulation to select an image region of the scanned image preview to retain; and
the component further configured to process the image region to generate a final scanned image.

19. An automatic document feed scanning device as recited in claim 18, wherein the component emulates a final-scan to process the image region.

20. An automatic document feed scanning device as recited in claim 18, wherein the component emulates a final-scan to process the image region without a re-scan of the image.

21. An automatic document feed scanning device as recited in claim 18, wherein the component performs a virtual final-scan to process the image region.

22. An automatic document feed scanning device as recited in claim 18, wherein the component processes the image data corresponding to the image region to generate the final scanned image.

23. An automatic document feed scanning device as recited in claim 18, wherein, to process the image region, the component interpolates the image data corresponding to the image region to improve a resolution of the image region.

24. An automatic document feed scanning device as recited in claim 18, wherein, to process the image region, the component emulates a final-scan of the image region by interpolating the image data corresponding to the image region to improve a resolution of the image region.

25. An automatic document feed scanning device as recited in claim 18, further comprising an image destination selection control configured for manipulation to select a destination location for the final scanned image, wherein the component is configured to differently process the image data based upon the destination location to form the emulated final scan image data.

26. An automatic document feed scanning device as recited in claim 18, further comprising an image region definition control configured for manipulation to define a classification of the image region.

27. An automatic document feed scanning device as recited in claim 18, further comprising a user interface that includes the image region selection control and a viewing region to display the scanned image preview.

28. An automatic document feed scanning device as recited in claim 18, further comprising:
an image destination selection control configured for manipulation to select a destination location for the final scanned image; and
a user interface that includes the image region selection control, the image destination selection control, and a viewing region to display the scanned image preview.

29. An automatic document feed scanning device as recited in claim 18, further comprising:
an image region definition control configured for manipulation to define a classification of the image region; and
a user interface that includes the image region selection control, the image region destination control, and a viewing region to display the scanned image preview.

30. An automatic document feed scanning device as recited in claim 18, further comprising:
an image destination selection control configured for manipulation to select a destination location for the final scanned image;
an image region definition control configured for manipulation to define a classification of the image region; and
a user interface that includes the image region selection control, the image destination selection control, the image region definition control, and a viewing region to display the scanned image preview.

31. A method, comprising: generating a scanned image preview from image data corresponding to an image; defining an image region of the scanned image preview to retain; and emulating a final-scan of the image region to generate a final scanned image, wherein emulating includes emulating the final-scan of the image region without a re-scan of the image.

32. A method as recited in claim 31, further comprising preview-scanning the image to generate the image data.

33. A method as recited in claim 31, wherein emulating includes processing the image data corresponding to the image region.

34. A method as recited in claim 31, wherein emulating includes interpolating the image data to improve a resolution of the image region.

35. A method as recited in claim 31, further comprising selecting a destination location for the final scanned image.

36. A method as recited in claim 31, further comprising selecting a data storage component as a destination location for the final scanned image.

37. A method as recited in claim 31, further comprising selecting an image reproduction device as a location for the final scanned image.

38. A method as recited in claim 31, further comprising defining a classification of the image region.

39. A method as recited in claim 31, further comprising defining the image region as a photograph, and generating the final scanned image as bit map data.

40. A method as recited in claim 31, further comprising defining the image region as text, and processing the final scanned image with an optical character recognition component to form text data.

41. A method as recited in claim 31, further comprising defining the image region as a graphic, and generating the final scanned image as raster graphic data.

42. One or more computer-readable media comprising computer executable instructions that, when executed, direct an automatic document feed scanning device to perform a method comprising emulating a final-scan of an image region of a scanned image preview to generate a final scanned image by processing image data corresponding to the image region.

43. One or more computer-readable media comprising computer executable instructions that, when executed, direct a computing system to perform a method comprising:
generating a scanned image preview from image data corresponding to an image; and
emulating a final-scan of an image region of the scanned image preview to generate a final scanned image, wherein emulating includes interpolating the image data to improve a resolution of the image region.

44. One or more computer-readable media as recited in claim 43, wherein the method further comprises communicating the final scanned image to a destination location.

45. One or more computer-readable media as recited in claim 43, wherein the method further comprises communicating the final scanned image to a data storage component, and maintaining the final scanned image with the data storage component.

46. One or more computer-readable media comprising computer executable instructions that, when executed, direct an automatic document feed scanning device to perform a method comprising: generating a scanned image preview from image data corresponding to an image; and emulating a final-scan of an image region of the scanned image preview to generate a final scanned image, wherein emulating includes interpolating the image data to improve a resolution of the image region.

47. One or more computer-readable media as recited in claim 46, wherein the method further comprises communicating the final scanned image to a destination location.

48. One or more computer-readable media as recited in claim 46, wherein the method further comprises communicating the final scanned image to a data storage component in the automatic document feed scanning device, and maintaining the final scanned image with the data storage component.

49. One or more computer-readable media as recited in claim 46, wherein the method further comprises communicating the final scanned image to an image reproduction device in the automatic document feed scanning device, and reproducing the final scanned image with the image reproduction device.

50. An imaging system, comprising:
a component configured to generate a scanned image preview from image data corresponding to an image, the scanned image preview representing the image in an electronic form;
an image region selection control configured for manipulation to select an image region of the scanned image preview to retain; and
the component further configured to emulate a final-scan of the image region to generate a final scanned image, wherein the component is further configured to emulate the final-scan of the image region by interpolating the image data corresponding to the image region to improve a resolution of the image region.

51. An imaging system, comprising:
a component configured to generate a scanned image preview from image data corresponding to an image, the scanned image preview representing the image in an electronic form;
an image region selection control configured for manipulation to select an image region of the scanned image preview to retain;
the component further configured to emulate a final-scan of the image region to generate a final scanned image; and
an image region definition control configured for manipulation to define the image region as text, wherein the final scanned image is processed with an optical character recognition component to form text data.

52. An imaging system, comprising:
a component configured to generate a scanned image preview from image data corresponding to an image, the scanned image preview representing the image in an electronic form;
an image region selection control configured for manipulation to select an image region of the scanned image preview to retain;
the component further configured to emulate a final-scan of the image region to generate a final scanned image;
an image region definition control configured for manipulation to define a classification of the image region; and
a user interface that includes the image region selection control, the image region destination control, and a viewing region to display the scanned image preview.

53. A method, comprising:
generating a scanned image preview from image data corresponding to an image;
defining an image region of the scanned image preview to retain; and
emulating a final-scan of the image region to generate a final scanned image, wherein emulating includes interpolating the image data to improve a resolution of the image region, wherein the emulating the final-scan of the image region is performed without a re-scan of the image.

* * * * *